United States Patent [19]

David et al.

[11] Patent Number: 4,682,217

[45] Date of Patent: Jul. 21, 1987

[54] VIDEO SIGNAL PROCESSING

[75] Inventors: Morgan W. A. David, Farnham; David J. Hedley, Winchester, both of United Kingdom

[73] Assignee: Sony Corporation, Tokyo, Japan

[21] Appl. No.: 860,209

[22] Filed: May 6, 1986

[30] Foreign Application Priority Data

May 8, 1985 [GB] United Kingdom ............... 8511648
May 8, 1985 [GB] United Kingdom ............... 8511649

[51] Int. Cl.$^4$ ..................... H04N 13/00; H04N 7/18
[52] U.S. Cl. ................................. 358/89; 358/104; 358/107; 364/522; 340/729
[58] Field of Search .................. 358/89, 107, 104; 350/144; 352/86, 57; 353/10; 364/522; 340/729, 747

[56] References Cited

U.S. PATENT DOCUMENTS

| 3,261,912 | 7/1966 | Hemstreet | 358/104 |
| 3,602,702 | 8/1971 | Warnock | 340/729 |
| 4,414,565 | 11/1983 | Shanks | 358/89 |
| 4,489,389 | 12/1984 | Beckwith et al. | 364/522 |

OTHER PUBLICATIONS

J. Blinn et al.; "Texture and Reflection in Computer Generated Images"; Tutorial Computer Graphic—IEEE Computer Society; 1979; pp. 362–367.

Primary Examiner—Howard W. Britton
Assistant Examiner—John K. Peng
Attorney, Agent, or Firm—Lewis H. Eslinger; Alvin Sinderbrand

[57] ABSTRACT

A method of and apparatus for processing video signals to achieve a visual effect corresponding to that which would be achieved if an input two-dimensional image were projected on to a three-dimensional surface is disclosed. A video signal is formed into digitized sample values each having an input pixel address comprising X and Y coordinate values. X and Y scaling multipliers and Z coordinate values corresponding to the respective pixel addresses on the three-dimensional surface to which each of the input pixel addresses will be moved in achieving the effect are stored in a mapping store. Multipliers multiply the X and Y coordinate values of each input pixel address by the corresponding X and Y scaling multipliers, and the resulting scaled X and Y coordinate values and the associated Z coordinate values are supplied to a perspective transformation device to derive the output X and Y coordinate values corresponding to the effect.

10 Claims, 9 Drawing Figures

VIDEO SIGNAL PROCESSING

BACKGROUND OF THE INVENTION

1. Field of the Invention

This invention relates to methods of and circuits for video signal processing. More particularly, but not exclusively, this invention relates to video signal processing circuits which are suitable for use in special effects equipment in high definition video systems. Embodiments of the invention are able to achieve a visual effect corresponding to that which would be obtained if an input two-dimensional image were projected onto a three-dimensional surface. Reference is also made to linear manipulation of an image in two or three dimensions.

2. Description of the Prior Art

The standard television signal transmitted in the United Kingdom is a PAL signal of a 625-lines per frame, 50-fields per second system, and the PAL, NTSC and SECAM signals transmitted in other countries use similar or slightly lower line frequencies (for example 525 lines per frame), and similar or slightly higher field frequencies (for example 60 fields per second). While there is no immediate prospect of significant changes in these transmitted signals, there is an increasing requirement for higher definition video systems. Such systems can be used, for example, in film-making, in closed circuit television systems, in satellite communication systems and in studio use generally. One such proposed high definition video system uses 1125 lines per frame and 60 fields per second. This proposed system also uses a 5:3 aspect ratio instead of the 4:3 aspect ratio now usual for television receivers.

The special effects which can be applied to a video signal are well known. Thus, for example, images on a cathode ray tube can be off-set (moved in any direction), scaled (expanded or compressed in size), rolled (rotated) in two or three dimensions and so on.

One way of achieving such special effects, which will be referred to in more detail below, involves converting an input analog video signal into digitized sample values each having a pixel address, modifying the resulting individual pixel addresses to achieve the required special effect, storing the sample values at the modified pixel addresses in a field memory, and reading from the field memory to derive the sample values for reconversion into the required output analog signal.

The effects to be achieved by special effects equipment can in general be divided into two types; those which do not bend or twist the image plane, that is to say linear effects, which may nonetheless be three-dimensional, and those which do distort the image plane by projecting the image onto a three-dimensional shape, that is to say non-linear effects. An example of a three-dimensional linear effect is tilting the image plane with perspective, as in a tumble or flip. An example of a three-dimensional nonlinear effect is the projection of the input image plane onto the surface of a cone.

Two of the processes involved in producing three-dimensional effects whether linear or non-linear are; transformation of the initial two-dimensional pixel addresses to pixel addresses in three-dimensional space, and then perspective transformation back onto the two-dimensional viewing plane.

For linear effects, the required two or three-dimensional pixel addresses can be derived by matrix calculation as used, for example, in computer graphics. However, substantial modification of the techniques is necessary to achieve operation in real time as required in a television system. For non-linear effects, there is a requirement for methods and circuits which can not only achieve the required effect, but can also do so at the required speeds and without requiring hardware which is too extensive or too complex. This forms the subject of the present application.

SUMMARY OF THE INVENTION

One object of the present invention is to provide an improved method of processing video signals to achieve a visual effect corresponding to that which would be achieved if an input two-dimensional image were projected onto a three-dimensional surface.

Another object of the present invention is to provide an improved circuit for processing video signals to achieve a visual effect corresponding to that which would be achieved if an input two-dimensional image were projected onto a three-dimensional surface, the circuit using a mapping store.

Another object of the present invention is to provide an improved circuit for processing video signals to achieve a visual effect involving linear manipulation of an image, the circuit comprising a microprocessor and a hardware matrix circuit.

According to the present invention there is provided a method of processing video signals to achieve a visual effect corresponding to that which would be achieved if an input two-dimensional image were projected onto a three-dimensional surface, the method comprising:

forming a video signal corresponding to said input two-dimensional image into digitized sample values each having an input pixel address comprising X and Y coordinate values;

storing X and Y scaling multipliers and Z coordinate values corresponding to the respective pixel addresses on said three-dimensional surface to which each of said input pixel addresses will be moved in achieving said visual effect;

deriving from store the corresponding said X and Y scaling multipliers and Z coordinate value for each said input pixel address and multiplying said X and Y coordinate values of each said input pixel address by the corresponding said X and Y scaling multipliers respectively; and supplying the resulting scaled X and Y coordinate values and the associated Z coordinate value to a perspective transformation device to derive the required output X and Y coordinate values corresponding to said visual effect.

According to the present invention there is also provided a circuit for processing video signals to achieve a visual effect corresponding to that which would be achieved if an input two-dimensional image were projected onto a three-dimensional surface, the circuit comprising:

means for providing a video signal corresponding to said input two-dimensional image in the form of digitized sample values each having an input pixel address comprising X and Y coordinate values;

a mapping store for storing X and Y scaling multipliers and Z coordinate values corresponding to the respective pixel addresses on said three-dimensional surface to which each of said input pixel addresses will be moved in achieving said visual effect;

multiplier means for multiplying said X and Y coordinate values of each said input pixel address by the corresponding said X and Y scaling multipliers derived from said mapping store; and a perspective transformation device to which the resulting scaled X and Y coordinate values and the associated Z coordinate values are supplied and which derives output X and Y coordinate values corresponding to said visual effect.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
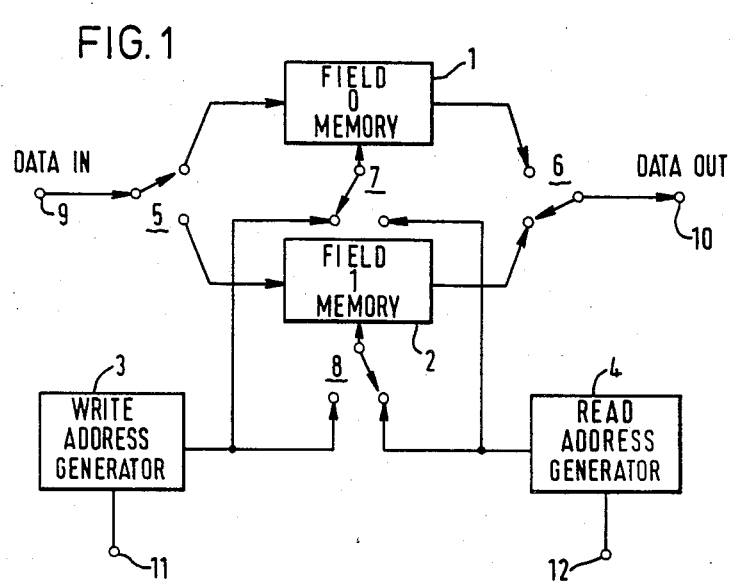
FIG. 1 shows in simplified block form part of a special effects equipment for a high definition video system.

Before describing the embodiment, part of the overall arrangement of an example of a special effects equipment for the high definition video system outlined above will be briefly described with reference to FIG. 1. Basically, the special effects equipment comprises two field memories, a field zero memory 1 and a field one memory 2, together with a write address generator 3 and a read address generator 4. These elements are interconnected by switches 5, 6, 7 and 8, each of which is operated at the field frequency. Input data in the form of digitized sample values supplied to an input terminal 9 are selectively supplied by way of the switch 5 to the field zero memory 1 or the field one memory 2. Output data for supply to an output terminal 10 are selectively derived by the switch 6 from the field zero memory 1 or the field one memory 2. The write address generator 3 and the read address generator 4 are selectively and alternately connected to the field zero memory 1 and the field one memory 2 by the switches 7 and 8.

In operation of this special effects equipment, an input analog signal is sampled 2048 times per horizontal scan line and the resulting sample values are pulse code modulation coded into 8-bit words to form the input digital data which are supplied to the input terminal 9. Writing proceeds alternately in the field zero memory 1 and the field one memory 2 in dependence on the position of the switch 5 and under the control of the write address generator 3. The necessary complex address calculations which are required so as not only to achieve simple writing and reading of the individual digital signals into and out of the appropriate memory 1 or 2, but also to modify the pixel addresses in the cathode ray tube screen raster so as to achieve the required special effect are under control of a signal supplied to the write address generator 3 by way of an input terminal 11. When a complete field has been written in the memory 1 or 2, the switches 5 to 8 change position and the digital signals stored in that memory 1 or 2 are then sequentially read out under the control of the read address generator 4, which in turn is controlled by a signal supplied by way of an input terminal 12, and supplied to the output terminal 10, while the digital signals for the next field are written in the other memory 2 or 1.

The present invention is particularly concerned with the way in which the write address generator 3 performs the complex address calculations which are required to achieve a special effect, most particularly where that special effect is a three-dimensional non-linear effect.

Figure 2:
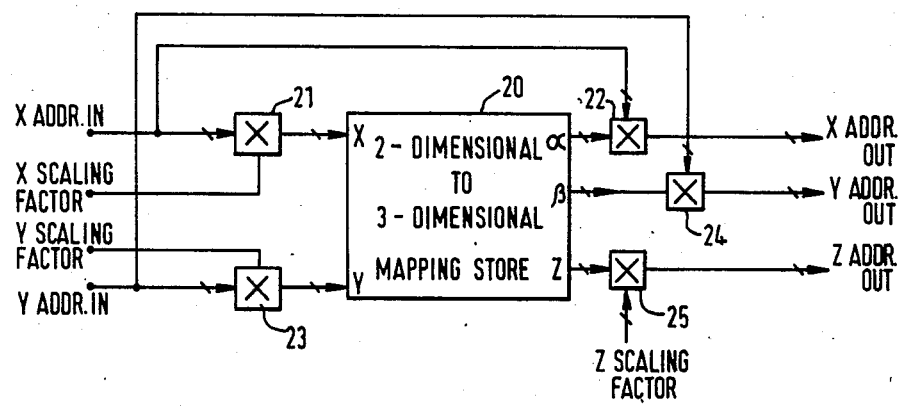
FIG. 2 shows in simplified block form the central part of an embodiment of video signal processing circuit according to the present invention.

Referring now to FIG. 2, the central part of the embodiment of video signal processing circuit to be described comprises a two-dimensional to three-dimensional mapping store 20 having two main inputs designated X and Y and three main outputs designated $\alpha$, $\beta$ and Z. To the X input, input X addresses of pixels are supplied by way of a multiplier 21, these input X addresses also being supplied to a multiplier 22 connected to the $\alpha$ output. Input Y addresses of pixels are supplied to the Y input by way of a multiplier 23, these input Y addresses also being supplied to a multiplier 24 connected to the $\beta$ output. A multiplier 25 is connected to the Z output. X, Y and Z outputs respectively are derived from the multipliers 22, 24 and 25. The multipliers 21, 23 and 25 can be controlled by an X scaling factor signal, a Y scaling factor signal and a Z scaling factor signal, respectively.

The mapping store 20 is a random access memory (RAM) operating as a look-up table, and is preloaded with data corresponding to the special effect which is to be achieved. Thus, the mapping store 20 contains instructions as to how to map X and Y coordinates corresponding to the pixel addresses in the raster of the two-dimensional input image to three-dimensional space. For each sample position there are stored three parameters; $\alpha$ and $\beta$ which are the X and Y scaling multipliers, and Z which is the absolute depth coordinate. Considering for a moment just one dimension, the effect on each pixel address in a horizontal line scan of the raster in achieving the required special effect is likely to be the horizontal movement of that pixel address to a different address. This change of address can be effected by multiplying the X coordinate of the original address by a scaling multiplier. In practice, the required special effect is likely to affect each pixel address by movement in two dimensions, so multiplication of both the X and Y coordinates of the original address of the pixel by respective scaling multipliers is likely to be required. As, therefore, each pixel address is supplied to the X and Y inputs of the mapping store 20, the mapping store 20 operates to access the appropriate scaling multipliers $\alpha$ and $\beta$ for that pixel address and supply them to the $\alpha$ and $\beta$ outputs. Additionally, however, it is likely that the required special effect will necessitate movement of the pixel address in the third or depth direction also, so a further operation of the mapping store 20 is to access and supply to the Z output thereof, the Z coordinate of the address corresponding to the pixel address designated by the X and Y coordinates of the input addresses and to the required special effect.

The scaling multipliers α and β corresponding to the input pixel address are therefore supplied to the multipliers 22 and 24 respectively, which also receive the input X andd Y addresses respectively of the input pixel. The multipliers 22 and 24 therefore scale the input X and Y addresses to the required new values which, together with the Z address derived from the mapping store 20, are supplied to the respective outputs.

The purpose of the multipliers 21, 23 and 25 will now be explained. The foregoing description assumes that the transition from the two-dimensional image to the three-dimensional non-linear effect is to be achieved in one step. Commonly, however, it is required that the special effect be achieved progressively over a succession of fields.

Figure 3:
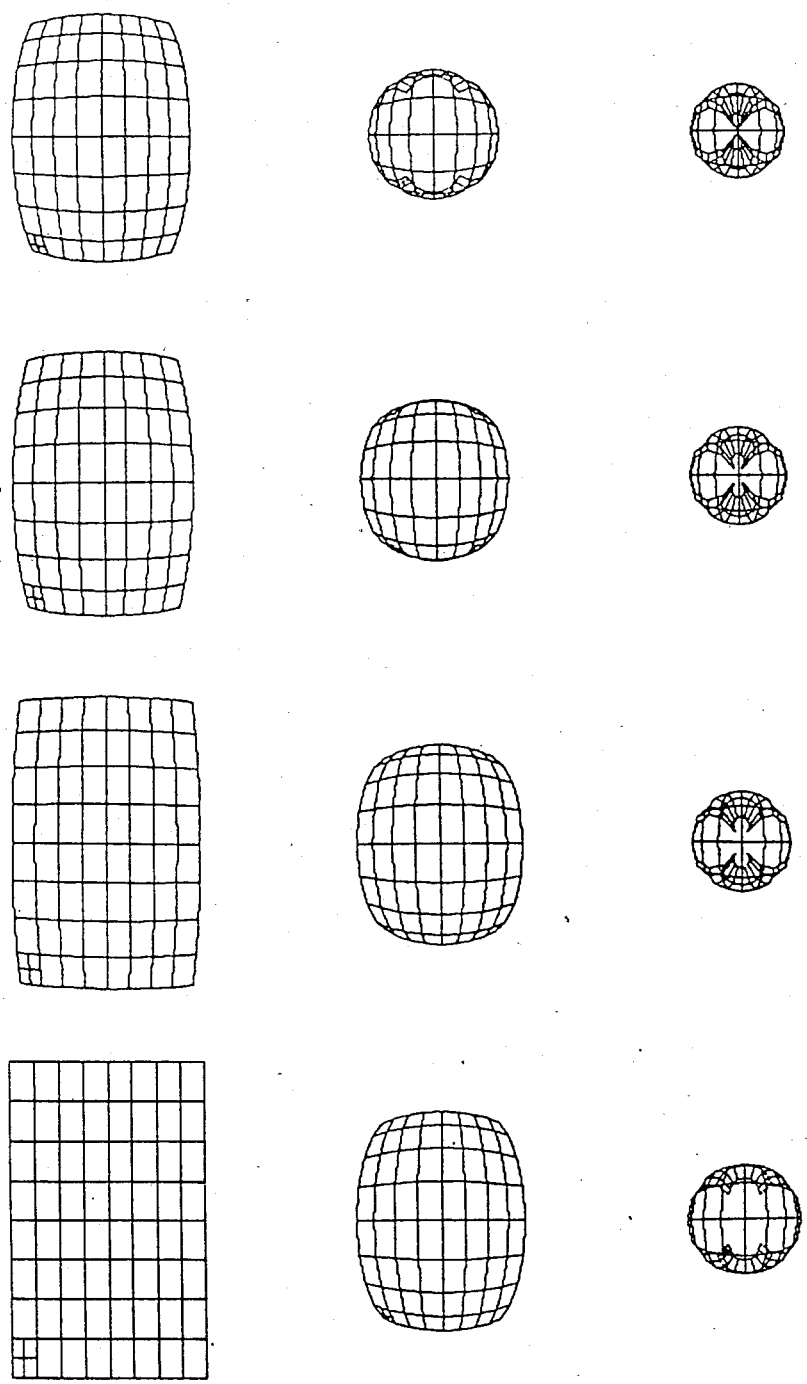
FIG. 3 shows a computer simulation in which an initially-flat 81-point grid is progressively mapped onto the surface of a sphere.

Referring to FIG. 3, suppose that the required special effect is the progressive change of an initial two-dimensional image so that the image appears to be being wrapped around the surface of a sphere. FIG. 3 shows a computer simulation of this special effect in which an initially-flat 81-point grid is progressively mapped onto the surface of a sphere. The first diagram shows the initial flat image and each of the 81 points appears as a rectangle, although it should be remembered that in the digital video signal each of these rectangles simply represents a pixel and so corresponds to a single sample value having X and Y addresses. Following through the diagrams successively will indicate how the sample values move as the special effect is progressively achieved. It will also be seen from the later diagrams, and in particular the final diagram, that as the special effect proceeds the situation arises that there are sample values having the same pixel address so far as the X and Y coordinates are concerned, but different Z addresses. In other words, some sample values have moved behind others. If a transparent effect is required, then both these sample values can be used in forming the output video signal, but if a solid effect is required, then the sample value nearer the viewing plane, that is having the smaller Z address, can be selected simply by comparison of the Z addresses of sample values having the same X and Y addresses.

Consideration of the final diagram in FIG. 3 will also show that the data to be loaded into the mapping store 20 can in this case be derived mathematically by calculating the way in which the positions of the individual pixel addresses have to change in moving from the initial two-dimensional image to the final three-dimensional image. Likewise, the necessary data can be calculated mathematically in the case of any special effect which involves mapping the initial two-dimensional image onto a three-dimensional surface which can readily be expressed in mathematical terms, such as the surface of a sphere, cylinder or cone. In the case, however, of a more complex surface such as the surface of a table or a telephone, then an additional computer analysis to map the surface in coordinate terms will first be required, and from this the computer can then calculate the data necessary for loading into the mapping store 20.

In an actual equipment a variety of different sets of α and β scaling multipliers and Z coordinates which have been pre-calculated are stored on disc for down-loading into the mapping store 20 when required for use.

Returning now to FIG. 2 and the question of progressively mapping the initial two-dimensional image onto the three-dimensional surface, this is achieved by the use of further scaling multipliers, which, to avoid confusion with the scaling multipliers α and β stored in the mapping store 20, will be called scaling factors, and in particular the X, Y and Z scaling factor signals which are supplied to the multipliers 21, 23 and 25 respectively. The effect of the X and Y scaling factor signals is initially to concentrate the input X and Y addresses in the centre of the two-dimensional area which is to be mapped onto the three-dimensional shape. The X and Y scaling factor signals then change progressively so that the addresses are in effect spread outwards to the boundaries to the three-dimensional shape. This spreading takes place progressively by progressively altering the values of the X and Y scaling factor signals.

Figures 4A, 4B, 4C:
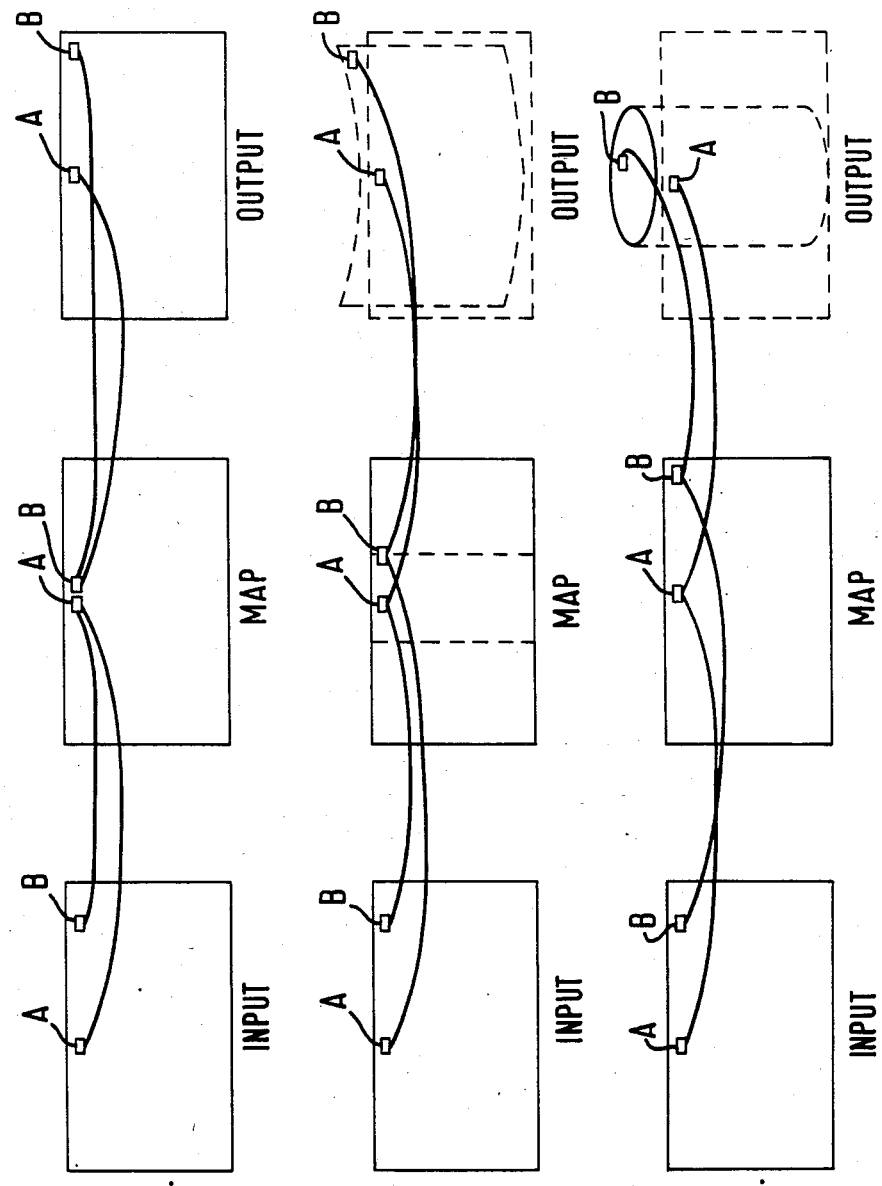
FIGS. 4A, 4B and 4C show diagrammatically the progressive mapping of an initially-flat image onto the surface of a cylinder.

This may be seen by reference to FIGS. 4A to 4C which shows the input, map and output at initial, intermediate and final stages respectively in mapping an initial two-dimensional image onto the surface of a cylinder. Throughout the progression the address of the pixel A at top centre of the initial image remains unchanged both by the scaling factors and the mapping, so the output address of the pixel A is the same as the input address. However, the address of a pixel B initially at top right is brought close to the centre by operation of the scaling factors in the initial stage shown in FIG. 4A, so the output address of pixel B is not at this initial stage substantially changed by the scaling multipliers in the mapping. At the intermediate stage shown in FIG. 4B, the address of the pixel B is not brought so close to the centre, so it is affected to some extent by the scaling multipliers in the mapping, and the output address shows the pixel B starting to move away from its original position as the initially flat plane of the image starts to curve to take up the shape of a cylinder. In the final stage shown in FIG. 4C, the scaling factors do not affect the input address of the pixel B, so the scaling multipliers in the mapping take full effect on this address and the output address of the pixel B is moved substantially, and in fact to the position which it is to occupy on the final cylindrically-shaped image.

It will be noted that in this case, as in the case of mapping onto the surface of a sphere as shown in FIG. 3, the addresses of some pixels have moved behind others. As mentioned above, if a transparent effect is required, then both these pixels can be used in forming the output video signal, but if a solid effect is required, then the pixel nearer the viewing plane, that is the one having the smaller Z address, can be selected simply by comparison of the Z addresses of the pixels having the same X and Y addresses.

Figure 5:
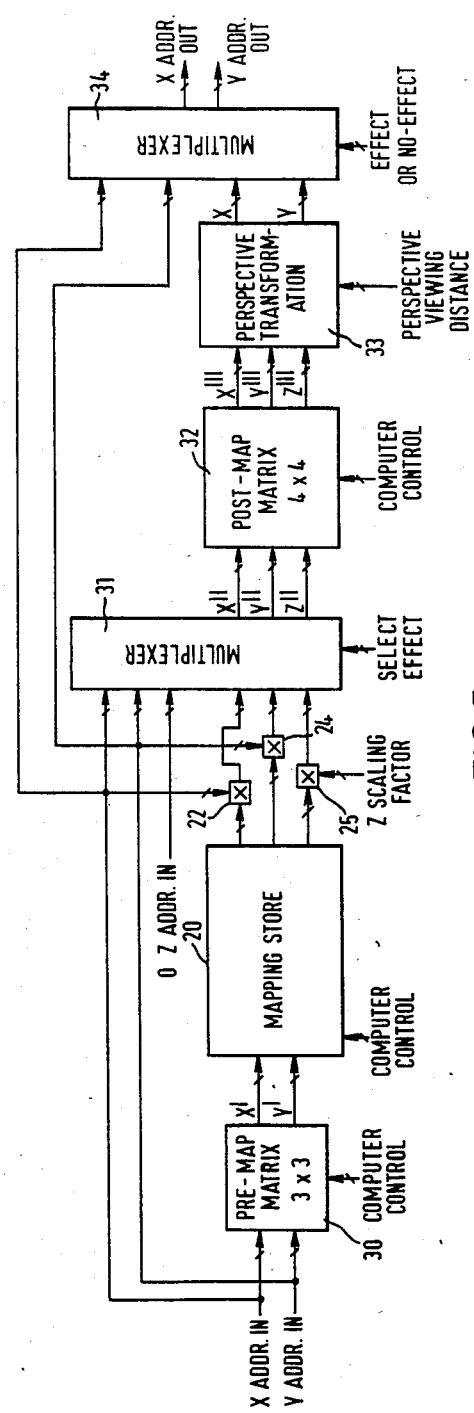
FIG. 5 shows in more detailed, but still simplified, block form the embodiment of FIG. 2.

Referring now to FIG. 5, this shows the embodiment in more detail, although still in simplified block form. This figure shows, in addition to the mapping store 20 and the multipliers 22, 24 and 25 (the multipliers 21 and 23 not being shown merely to simplify the figure); a pre-map matrix 30, a multiplexer 31, a post-map matrix 32, a perspective transformation device 33 and a further multiplexer 34. The input X and Y addresses are supplied to respective inputs of the pre-map matrix 30, the multipliers 22 and 24 as previously described, respective inputs of the multiplexer 31, and respective inputs of the multiplexer 34. Additionally the multiplexer 31 receives a zero Z input address, which is the Z address corresponding to all X and Y addresses on the initial two-dimensional image. Three further inputs of the multiplexer 31 respectively receive the outputs of the multipliers 22, 24 and 25, these being the X, Y and Z addresses respectively corresponding to the pixels of the input video data mapped in accordance with the required special effect.

The multiplexer 31 is operative under control of a linear/non-linear effect control signal to select either the initial input addresses or the input addresses after mapping, that is to say to include the non-linear special effect or not as required. The three output addresses supplied by the multiplexer 31, designated the X', the Y" and the Z" addresses are supplied to the post-map matrix 32, which supplies output X''', Y''' and Z''' addresses to the perspective transformation device 33. The perspective transformation device 33 also receives a perspective viewing distance control signal and supplies output addresses designated X and Y to the multiplexer 34. The multiplexer 34 also receives the input X and Y addresses, and under control of an effect/no-effect control signal supplies either the input X and Y addresses unchanged, or the output X and Y addresses derived in accordance with the required non-linear special effect and by the post-map matrix 32 and the perspective transformation device 33, or, if the multiplier 31 is controlled so that the input X and Y addresses by-pass the pre-map matrix 30 and the mapping store 20, the output X and Y addresses derived by the post-map matrix 32 and the perspective transformation device 33 only.

The pre-map matrix 30 is operative to cause any one or any combination of the two-dimensional effects of off-setting (shifting or translating the image in its plane), scaling (expanding or compressing the image) and rolling (rotating). Thus, for example, rotation about a non-central point involves the combination of off-setting to the point, rotation about that point and off-setting back to the initial position. These effects are all well known, and the necessary matrices are described in "Computer Graphics and Applications" by Dennis Harris, Chapman and Hall Computing 1984. To achieve each individual effect a $3 \times 2$ matrix is sufficient, but a third line is added simply to make the matrices $3 \times 3$, so that any two or more matrices can readily be multiplied together to give the required combination of effects. This multiplication is done in a microcomputer and when required, the resultant matrix is down-loaded as a set of coefficients for the pre-map matrix 30, which comprises multipliers and adders.

The post-map matrix 32 is operative to cause any one or any combination of the three-dimensional effects of off-setting (which may be in two-dimensions only), scaling, rolling, pitching and yawing. These effects also are all well known, and the necessary matrices are described in "Computer Graphics and Applications" referred to above. In this case to achieve each individual effect a $4 \times 3$ matrix is sufficient, but a fourth line is added simply to make the matrices $4 \times 4$, so that any two or more matrices can readily be multiplied together to give the required combination of effects. This multiplication is done in a microcomputer and when required, the resultant matrix is down-loaded as a set of coefficients for the post-map matrix 32, which comprises multipliers and adders. The images must be processed in real time, that is, all the processing necessary for each field must be performed at the video field rate, which, in the present example is 60 fields per second. It is not possible for a computer to perform the processing at the required high speed, so the post-map matrix 32 comprises a hybrid arrangement comprising a high speed microprocessor and a hardware matrix circuit. Basically, the microprocessor is required to calculate the coefficients of a single $4 \times 4$ matrix which is, if necessary, a composite matrix combining the matrices corresponding respectively to two or more of off-setting, scaling, rolling, pitching or yawing. The rather simpler pre-map matrix 30 is realised in a similar way, these two matrices 30 and 32 being described in more detail below.

The perspective transformation device 33 introduces geometrical perspective by adapting the X" and Y''' addresses in dependence on the Z''' addresses and on the selected viewing distance. This again is a known technique and the way it is done is described in "Computer Graphics and Applications" referred to above. The need to effect perspective transformation will be understood from a very simple example. Suppose an initial two-dimensional rectangular image is hinged rearwards about a horizontal axis coinciding with the top edge of the image. As this is done each pixel in the image will acquire a Z address (which will be zero for pixels lying along the axis), but initially the length of the bottom edge of the image will remain the same as the length of the top edge of the image. In other words there will be no perspective effect to delude the eye that the movement is in three dimensions. The function of the perspective transformation device 33 is to add the required geometrical perspective effect, which in the above simple example involves shortening the bottom edge, and progressively shortening the intervening horizontal lines.

Various modifications to and extensions of the above-described methods and apparatus are of course possible without departing from the appended claims. As an example of an extension, it is possible to arrange for progressions from one three-dimensional non-linear effect to another. For example, an initial two dimensional image may have been mapped onto the surface of a cylinder and may then be further mapped onto the surface of a sphere. To do this two mapping stores are required, or alternatively one substantially enlarged mapping store. Briefly the method involves deriving X and Y coordinate values multiplied by the respective $\alpha$ and $\beta$ scaling multipliers, and the associated Z coordinate values, both for the "cylindrical" image and the "spherical" image. The resulting X, Y and Z addresses are then averaged, the averaging being progressively weighted to give a progressive transformation of the image from "cylindrical" to "spherical" over a selected time interval.

In a further aspect, the present invention is also concerned with the way in which the write address generator 3 of FIG. 1 performs the complex address calculations which are required to achieve a special effect, most particularly where that special effect is a two or three-dimensional linear effect, and more particularly with the form and operation of the premap matrix 30 and the post-map matrix 32.

As described above, the pre-map matrix 30 is operative to cause any one or any combination of the two-dimensional effects of off-setting (shifting or translating the image in its plane), scaling (expanding or compressing the image) and rolling (rotating). To achieve each individual effect a $3 \times 2$ matrix is sufficient, but a third line is added simply to make the matrices $3 \times 3$, so that any two or more matrices can readily be multiplied together to give the required combination of effects. This multiplication is done in a microcomputer and when required, the resultant matrix is down-loaded as a set of coefficients for the pre-map matrix 30, which comprises multipliers and adders.

Also as described above, the post-map matrix 32 is operative to cause any one or any combination of the three-dimensional effects of off-setting (which may be in two-dimensions only), scaling, rolling, pitcing, and yawing. In this case to achieve each individual effect a 4×3 matrix is sufficient, but a fourth line is added simply to make the matrices 4×4, so that any two or more matrices can readily be multiplied together to give the required combination of effects, such as rolling about an off-set point, which involves off-setting, rolling and off-setting back, in which case, the three appropriate matrices are multilplied together to give a single matrix corresponding to the required effect. This multiplication is done in a microcomputer and when required, the resultant matrix is down-loaded as a set of coefficients for the post-map matrix 32, which comprises multipliers and adders.

Figure 6:
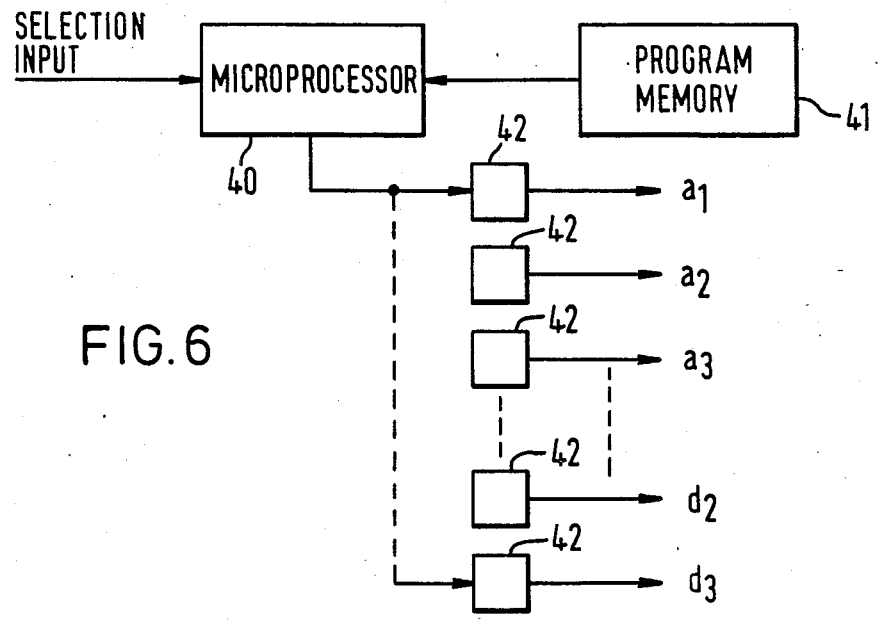
FIG. 6 shows in more detailed, but still simplified, block form part of the embodiment of FIG. 2.

An example of the post-map matrix 32 will now be described with references to FIGS. 6 and 7. From this it will be readily apparent how the rather simpler pre-map matrix 30 can be realised in a similar way.

As mentioned above, the mathematical operations which the post-map matrix 32 has to perform to achieve the three-dimensional effects of off-setting, scaling, rolling, yawing and pitching are known, for example, from "Computer Graphics and Applications" referred to above. However, in the present case the images must be processed in real time, that is, all the processing necessary for each field must be performed at the video field rate, which, in the present example is 60 fields per second. It is not possible for a computer to perform the processing at the required high speed, so the embodiment comprises a hybrid arrangement comprising a high speed microprocessor and a hardware matrix circuit. Basically, the microprocessor is required to calculate the coefficients of a single 4×4 matrix which is, if necessary, a composite matrix combining the matrices corresponding respectively to two or more of off-setting, scaling, rolling, pitching or yawing.

Suppose that the three-dimmensional input address of a pixel is x, y, z and that the output address, after a required manipulation, of that pixel is x new, y new, z new. In the general case, therefore, where the precise manipulation has not yet been specified:

$$x\text{ new} = a_1 x + b_1 y + c_1 z + d_1$$

$$y\text{ new} = a_2 x + b_2 y + c_2 z + d_2$$

$$z\text{ new} = a_3 x + b_3 y + c_3 z + d_3$$

where $a_1$, $a_2$, $a_3$, $b_1$, $b_2$, $b_3$, $c_1$, $c_2$, $c_3$, $d_1$, $d_2$ and $d_3$ are coefficients determined by the manipulation to be performed. Writing the above three equations in matrix form:

$$\begin{vmatrix} x\text{ new} \\ y\text{ new} \\ z\text{ new} \end{vmatrix} = \begin{vmatrix} a_1 & b_1 & c_1 & d_1 \\ a_2 & b_2 & c_2 & d_2 \\ a_3 & b_3 & c_3 & d_3 \end{vmatrix} \begin{vmatrix} x \\ y \\ z \\ 1 \end{vmatrix}$$

To make the centre matrix 4×4, so as to permit multiplication of such matrices, this can be re-written as:

$$\begin{vmatrix} x\text{ new} \\ y\text{ new} \\ z\text{ new} \\ 1 \end{vmatrix} = \begin{vmatrix} a_1 & b_1 & c_1 & d_1 \\ a_2 & b_2 & c_2 & d_2 \\ a_3 & b_3 & c_3 & d_3 \\ 0 & 0 & 0 & 1 \end{vmatrix} \begin{vmatrix} x \\ y \\ z \\ 1 \end{vmatrix}$$

In the case of off-setting, suppose that the image is to be off-set by distances Ox, Oy, Oz respectively in the three dimensions. Then:

$$x\text{ new} = x + Ox$$

$$y\text{ new} = y + Oy$$

$$z\text{ new} = z + Oz$$

and in this case the 4×4 matrix becomes:

$$\begin{vmatrix} 1 & 0 & 0 & Ox \\ 0 & 1 & 0 & Oy \\ 0 & 0 & 1 & Oz \\ 0 & 0 & 0 & 1 \end{vmatrix}$$

In the case of scaling, suppose that the image is to be scaled by scaling coefficients Sx, Sy, Sz respectively in the three dimensions. Then:

$$x\text{ new} = Sx \cdot x$$

$$y\text{ new} = Sy \cdot y$$

$$z\text{ new} = Sz \cdot z$$

and in this case the 4×4 matrix becomes:

$$\begin{vmatrix} Sx & 0 & 0 & 0 \\ 0 & Sy & 0 & 0 \\ 0 & 0 & Sz & 0 \\ 0 & 0 & 0 & 1 \end{vmatrix}$$

In the case of rolling, suppose that the image is to be rolled through an angle $\theta$. Then:

$$x\text{ new} = x \cos\theta + y \sin\theta$$

$$y\text{ new} = -x \sin\theta + y \cos\theta$$

$$z\text{ new} = z$$

and in this case the 4×4 matrix becomes:

$$\begin{vmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{vmatrix}$$

In the case of pitching, suppose that the image is to be pitched through an angle $\theta$. Then:

$$x\text{ new} = x$$

$$y\text{ new} = y \cos\theta + z \sin\theta$$

$$z\text{ new} = -y \sin\theta + z \cos\theta$$

and in this case the 4×4 matrix becomes:

$$\begin{vmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{vmatrix}$$

In the case of yawing, suppose that the image is to be yawed through an angle $\theta$. Then:

$$x = x\cos\theta + z\sin\theta$$

$$y = y$$

$$z = -x\sin\theta + z\cos\theta$$

and in this case the 4×4 matrix becomes:

$$\begin{vmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{vmatrix}$$

Any one or any combination of the above three-dimensional linear effects can be achieved by first selecting the appropriate matrix, or in the case of a combination selecting the appropriate matrices, substituting the required values of the parameters into the matrix or matrices, and, in the case of a combination multiplying the resulting matrices together. This first step is carried out by a microprocessor 40 shown in FIG. 6 under control of a program stored in a program memory 41 and selection inputs which specify which of the off-setting, scaling, rolling, pitching and yawing effects are required and, in the appropriate cases, the off-set distances, the scaling coefficients and the roll, pitch and yaw angles. Under control of the program, the microcomputer 40 then selects the appropriate 4×4 matrix or matrices, substitutes the parameters and, where necessary, multiplies the resulting matrices together to provide in each case an output matrix comprising the required coefficients $a_1$ to $d_3$ which are supplied to respective outputs by way of latch circuits 42. During each field period of the video signal to be processed then the microprocessor 40 performs the above operations so that the required coefficients $a_1$ to $d_3$ are available for use in the next field period.

Figure 7:
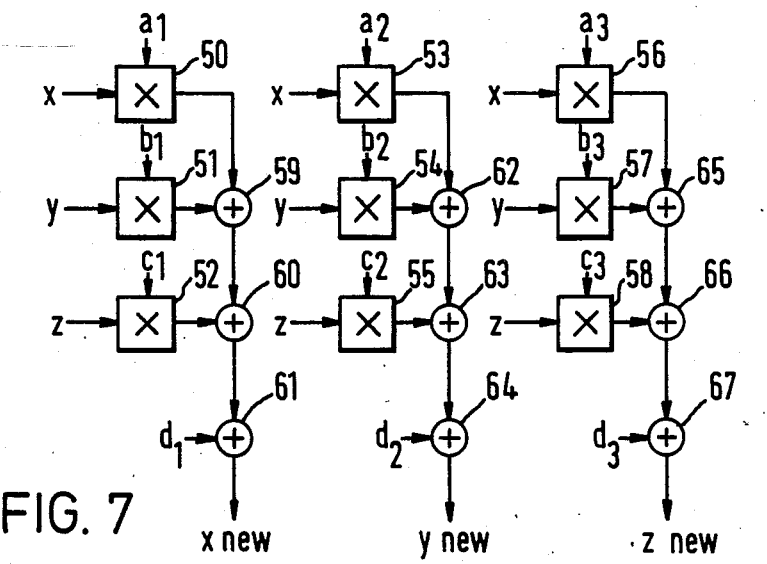
FIG. 7 shows in block form another part of the embodiment of FIG. 2.

The coefficients $a_1$ to $d_3$ are supplied to the hardware matrix circuit shown in block form in FIG. 7. The matrix circuit comprises nine multipliers 50 to 58 and nine adders 59 to 67. The output x new of each pixel in a field is derived by supplying the input coordinates x, y and z of that pixel to the multipliers 50, 51 and 52 respectively, where they are multiplied by the coefficients $a_1$, $b_1$ and $c_1$ respectively down-loaded from the microcmputer 40 at the end of the previous field. The output of the multipliers 50 and 51 are added by the adder 59, the output of the adder 59 is added to the output of the multiplier 52 by the adder 60, and the output of the adder 60 is added to the coefficient $d_1$ by the adder 61. The output of the adder 61 is x new. The outputs y new and z new are derived similarly.

The three outputs x new, y new and z new correspond to X''', Y''' and Z'' and are supplied to the perspective transformation device 33 shown in FIG. 5.

As mentioned above, the form and operation of the pre-map matrix 30 is similar, but with the simplificaton that because only the two-dimensional linear effects of off-setting, scaling and rolling are involved, the matrices are 3×3, and the matrix circuit is correspondingly simplified.

According to the present invention there is also provided a method of processing video signals to achieve a visual effect involving linear manipulation of an image, the method comprising:

storing in a microprocessor memory a respective n×n matrix corresponding to each said linear manipulation;

controlling said microprocessor to select said matrix, or for visual effect involving a combinaton of two or more said linear manipulations said matrices, corresponding to said visual effect;

controlling said microprocessor to substitute into the selected matrix or matrices the respective parameters of said visual effect;

for a visual effect involving a combination of two or more said linear manipulations, controlling said microprocessor to multiply the substituted matrices together;

deriving from the resulting matrix to coefficients required to calculate from input pixel addresses of said image the output pixel addresses corresponding to said visual effect; and supplying said coefficients and signals representing the coordinates of said input pixel addresses to a hardware matrix circuit which derives therefrom the signals representing the coordinates of the output pixel address corresponding to said visual effect.

And according to the present invention there is also provided a circuit for processing video signals to achieve a visual effect involving linear manipulation of an image, the circuit comprising:

a microprocessor comprising a memory in which is stored a respective n×n matrix corresponding to each said linear manipulation;

means for supplying selection inputs to said microprocessor to control said microprocessor to select said matrix, or for a visual effect involving a combination of two or more said linear manipulations, said matrices corresponding to said visual effect, to substitute into the selected matrix or matrices the respective parameters of said visual effect, for a visual effect involving a combination of two or more said linear manipulations to multiply the substituted matrices together, and to derive the resulting matrix the coefficients required to calculate from input pixel addresses of said image the output pixel addresses corresponding to said visual effect; and a hardware matrix circuit to which are supplied said coefficients and signals representing the coordinates of said input pixel addresses and which is operative to derive therefrom the output pixel addresses corresponding to said visual effect.

Although described in relation to the above high definition video system, it will be realised that the invention can equally be applied to the processing of any video signal which can be expressed in the necessary digital form.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing video signals to achieve a visual effect corresponding to that which would be achieved if an input two-dimensional image were projected onto a three-dimensional surface, the method comprising:

forming a video signal correspondng to said input two-dimensional image into a digitized sample values each having an input pixel adderess comprising X and Y coordinate values;

storing X and Y scaling multipliers and Z coordinate values corresponding to the respective pixel addresses on said three-dimensional surface to which each of said input pixel addresses will be moved in achieving said effect;

deriving from store the corresponding said X and Y scaling multipliers and Z coordinate value for each said input pixel address and multiplying said X and Y coordinate values of each said input pixel address by the corresponding said X and Y scaling multipliers respectively; and supplying the resulting scaled X and Y coordinate values and the associated Z coordinate value to a perspective transformation device to derive the required output X and Y coordinate values corresponding to said effect.

2. A method according to claim 1 further comprising multiplying said X and Y coordinate values of each said input pixel address by respective progressively changing X and Y scaling factors and then multiplying said X and Y coordinate values by said respective X and Y scaling multipliers corresponding to the resulting scaled X and Y coordinate values, and multiplying each said derived Z coordinate value by a respective progressively changing Z scaling factor, whereby said X and Y coordinate values and said derived Z coordinate values are changed progressively so that said output X and Y coordinate values move progressively from the positions in said input two-dimensional image to the final positions corresponding to said effect.

3. A method according to claim 1 of processing video signals to achieve a visual effect corresponding to that which would be achieved if said input two-dimensioal image were projected onto said three-dimensional surface and then a further visual effect corresponding to that which would be achieved if said input two-dimensional image as projected onto said three-dimensional surface were transformed as if projected onto a further, different, three-dimensional surface, the method further comprising:

storing further X and Y scaling multipliers and further Z coordinate values corresponding to the respective pixel addresses on said further three-dimensional surface to which each of said input pixel addresses will be moved in achieving said further effect;

deriving from store the corresponding said further X and Y scaling multipliers and further Z coordinate value for each said input pixel address and multiplying said X and Y coordinate values of each said input pixel adress by the corresponding said further X and Y scaling multipliers respectively;

deriving progressively weighted averages of said resulting scaled X and Y coordinate values and the associated Z coordinate value and the resulting further scaled X and Y coordinate values and the associated further Z coordinate value; and supplying the resulted averaged X and Y coordinate values and the associated Z coordinate value to said perspective transformation device to derive said required output X and Y coordinate values corresponding to a progressive transformation from said effect to said further effect.

4. A method according to claim 1 of processing video signals also to achieve a linear visual effect involving linear manipulation of an image, the method further comprising:

storing in a microprocessor memory a respective $n \times n$ matrix corresponding to each said linear manipulation;

controlling said micrprocessor to select said matrix, or for a linear visual effect invoving a combination of two or more linear manipulations said matrices, corresponding to said linear visual effect;

controlling said microprocessor to substitute into the selected matrix or matrices the respective parameters of said linear visual effect;

for a linear visual effect involving a combination of two or more said linear manipulations, controlling said microprocessor to multiply the substituted matrices together;

deriving from the resulting matrix the coefficients to calculate from input pixel addresses of said image the output pixel addresses corresponding to said linear visual effect; and supplying said coefficients and signals representing the coordinates of said input pixel addresses to a hardware matrix circuit which derives therefrom the signals representing the coordinates of the putput pixel address corresponding to said linear visual effect.

5. A circuit for processing video signals to achieve a visual effect corresponding to that which would be achieved if an input two-dimensional image were projected onto a three-dimensional surface, the circuit comprising:

means for providing a video signal corresponding to said input two-dimensional image in the form of digitized sample values each having an input pixel address comprising X and Y coordinate values;

a mapping store for storing X and Y scaling multipliers and Z coordinate values corresponding to the respective pixel addresses on said three-dimensional surface to which each of said input pixel addresses will be moved in achieving said effect;

multiplier means for multiplying said X and Y coordinate values of each said input pixel address by the corresponding said X and Y scaling multipliers derived from said mapping store; and a perspective transformation device to which the resulting scaled X and Y coordinate values and the associated Z coordinate values are supplied and which derives output X and Y coordinate values corresponding to said effect.

6. A circuit according to claim 5 comprising first, second, third, fourth and fifth multipliers, said X and Y coordinate values of each said input pixel address being multiplied in said first and second multipliers respectively by respective progressively changing X and Y scaling factors and said X and Y coordinate values then being multiplied in said third and fourth multipliers respectively by said respective derived X and Y scaling multipliers corresponding to the resulting scaled X and Y coordinate values, and each said Z coordinate being multiplied in said fifth multiplier by a respective progressively changing Z scaling factor, whereby said X and Y coordinate values and said derived Z coordinate values are changed progressively so that said output X and Y coordinate values move progressively from the positions in said input two-dimensional image to the final positions corresponding to said effect.

7. A circuit according to claim 5 for processing video signals to achieve a visual effect corresponding to that which would be achieved if said input two-dimensional image were projected onto said three-dimensional surface and then a further visual effect corresponding to that which would be achieved if said input two-dimensional image as projected onto said three-dimensional surface were transformed as if projected onto a further, different, three-dimensional surface, the circuit comprising:
   a mapping store for storing further X and Y scaling multipliers and further Z coordinate values corresponding to the respective pixel addresses on said further three-dimensional surface to which each of said input pixel will be moved in achieving said further effect;
   multiplier means for multiplying said X and Y coordinate values of each said input pixel address by the correspondng said further X and Y scaling multipliers respectively; and
   means for deriving progessively weighted averages of said resulting scaled X and Y coordinate values and the associated Z coordinate value and the resulting further scaled X and Y coordinate values and the associated further Z coordinate value
   the resulting averaged X and Y coordinate values and the associated averaged Z coordinate value being supplied to said perspective transformation device to derive said required output X and Y coordinate values correspondng to a progressive transformation from said effect to said further effect.

8. A circuit according to claim 5 further comprising a first matrix to which said X and Y coordinate values of each said input pixel address are supplied to effect off-setting or scaling or rotating or any combination thereof, of said input two-dimensional image.

9. A circuit according to claim 5 further comprising a second matrix to which said resulting scaled X and Y coordinate values and the associated Z coordinate values or said resulting averaged X and Y coordinate values and the associate averaged Z coordinate values are supplied to effect off-setting or scaling or rolling or pitching or yawing or any combination thereof, of the image corresponding to said effect or said further effect.

10. A circuit according to claim 5 for processing video signals also to achieve a linear visual effect involving linear manipulation of an image, the circuit further comprising:
   a microprocessor comprising a memory in which is stored a respective $n \times m$ matrix corresponding to each said linear manipulation;
   means for supplying selection inputs to said microprocessor to control said microprocessor to select said matrix, or for a linear visual effect involving a combination of two or more said linear manipulations, said matrices corresponding to said linear visual effect, to substitute into the selected matrix or matrices the respective parameters of said linear visual effect, for a linear visual effect involving a combination of two or more said linear manipulations to multiply the substituted matrices together, and to derive from the resulting matrix the coefficients required to calculate from input pixel addresses of said image the output pixel addresses corresponding to said linear visual effect; and
   a hardware matrix circuit to which are supplied said coefficients and signals representing the coordinates of said input pixel addresses and which is operative to derive therefrom the output pixel addresses corresponding to said linear visual effect.

* * * * *